United States Patent
Srinivasan et al.

(10) Patent No.: US 11,161,191 B2
(45) Date of Patent: Nov. 2, 2021

(54) PROCESS AND APPARATUS FOR WELDING WORKPIECE HAVING HEAT SENSITIVE MATERIAL

(71) Applicant: Siemens Energy, Inc., Orlando, FL (US)

(72) Inventors: Shankar P. Srinivasan, Tega Cay, SC (US); Margarita Estrada, Charlotte, NC (US); Ryan Kapustka, Grove City, OH (US)

(73) Assignee: Siemens Energy, Inc., Orlando, FL (US)

( * ) Notice: Subject to any disclaimer, the term of this patent is extended or adjusted under 35 U.S.C. 154(b) by 922 days.

(21) Appl. No.: 15/453,457

(22) Filed: Mar. 8, 2017

(65) Prior Publication Data

US 2018/0021871 A1    Jan. 25, 2018

Related U.S. Application Data

(60) Provisional application No. 62/364,134, filed on Jul. 19, 2016.

(51) Int. Cl.
*B23K 9/26* (2006.01)
*B23K 9/00* (2006.01)
(Continued)

(52) U.S. Cl.
CPC ............ *B23K 9/0026* (2013.01); *B23K 9/124* (2013.01); *B23K 9/16* (2013.01); *B23K 9/173* (2013.01); *B23K 9/23* (2013.01); *B23K 2103/04* (2018.08)

(58) Field of Classification Search
CPC ........ B23K 9/0026; B23K 9/124; B23K 9/16; B23K 9/173; B23K 9/23; B23K 9/12; B23K 35/00; B23K 35/0255; B23K 35/22
(Continued)

(56) References Cited

U.S. PATENT DOCUMENTS

| 4,441,012 | A |   | 4/1984  | Risbeck et al. |
| 5,272,315 | A | * | 12/1993 | Guth ...................... B23K 31/02 219/137 R |

(Continued)

FOREIGN PATENT DOCUMENTS

| DE | 102011121705 A1 | 6/2013 |
| EP | 2862661 A1      | 6/2012 |

(Continued)

OTHER PUBLICATIONS

Welding Electrodes Catalog, Ador Welding, pp. 1-207 [accessed at https://www.adorwelding.com/images/pdf/brochures_catalogs/Electrode-Booklet.pdf on Apr. 10, 2020]. (Year: 2020).*

(Continued)

*Primary Examiner* — Robert J Utama
*Assistant Examiner* — Ayub A Maye

(57) ABSTRACT

Process and apparatus for welding workpiece have heat sensitive material are proposed. The heat sensitive material includes austenitic manganese steel, also referred to as Hadfield manganese steel. The process reciprocates filler metal in and out of weld pool. The motion of the filler metal may be synchronized with waveform of power source. Welding parameters are adjusted such that weld may be performed on the workpiece without cracking the heat sensitive material. The process allows Hadfield manganese steel to be welded to generator components in power generation applications. The process provides reliable and repeatable welding quality.

20 Claims, 5 Drawing Sheets

(51) Int. Cl.
*B23K 9/173* (2006.01)
*B23K 9/12* (2006.01)
*B23K 9/16* (2006.01)
*B23K 9/23* (2006.01)
*B23K 103/04* (2006.01)

(58) Field of Classification Search
USPC .. 219/137 WM, 130.1, 130.5, 130.51, 146.1
See application file for complete search history.

(56) References Cited

U.S. PATENT DOCUMENTS

| | | | | |
|---|---|---|---|---|
| 5,990,446 | A * | 11/1999 | Zhang | B23K 10/02 |
| | | | | 219/121.45 |
| 2002/0004105 | A1* | 1/2002 | Kunze | B22F 3/1055 |
| | | | | 427/586 |
| 2003/0121574 | A1* | 7/2003 | Brenner | B23K 10/027 |
| | | | | 148/565 |
| 2005/0155960 | A1* | 7/2005 | Bonnet | B23K 35/3053 |
| | | | | 219/137 WM |
| 2005/0263500 | A1* | 12/2005 | Briand | B23K 26/348 |
| | | | | 219/121.64 |
| 2012/0145691 | A1 | 6/2012 | Fujiwara et al. | |
| 2013/0153557 | A1* | 6/2013 | Pagano | B23K 9/0216 |
| | | | | 219/130.51 |
| 2013/0193124 | A1* | 8/2013 | Peters | B23K 26/242 |
| | | | | 219/121.63 |
| 2014/0027426 | A1* | 1/2014 | Hutchison | B23K 35/3608 |
| | | | | 219/130.5 |
| 2014/0299590 | A1 | 10/2014 | Flügge et al. | |
| 2014/0349136 | A1* | 11/2014 | Barhorst | B23K 35/3053 |
| | | | | 428/684 |
| 2014/0367365 | A1* | 12/2014 | Zhang | B23K 9/188 |
| | | | | 219/73 |
| 2017/0157692 | A1* | 6/2017 | Kozak | B23K 9/232 |
| 2017/0304923 | A1* | 10/2017 | Ash | B23K 9/1093 |

FOREIGN PATENT DOCUMENTS

| | | |
|---|---|---|
| JP | S4848340 A | 7/1973 |
| JP | S58122182 A | 7/1983 |
| JP | H06306529 A | 11/1994 |
| JP | 2011013321 A | 1/2011 |
| JP | 2011200903 A | 10/2011 |
| JP | 5540391 B2 | 7/2014 |
| JP | 2014163587 A | 9/2014 |
| JP | 2015058454 A | 3/2015 |

OTHER PUBLICATIONS

Yukinori Hirota, "Part II Recent Trends in Industry and Welding Engineering, II Welding/Joining and Related Equipment, . Welding System", Journal of the Japan Welding Society, Japan, vol. 81, 2012, No. 5, pp. 81-83.

Nick Kapustka, "Reciprocating Wire Feed GMAW—An Advanced Short Circuit GMAW Mode", EWI, Consumer Electronics (https://ewi.org/consumer-electronics/), Aug. 31, 2014, pp. 1-7.

G. Prakasham, Dr. L. Siva Rama Krishna, Dr. A. Seshu Kumar, "A Review on the Effect of Various Process Parameters in Cold Metal Transfer (CMT) GMAW Welding", International Journal of Engineering Research, vol. No. 5, Issue Special 2, pp. 432-435.

* cited by examiner

PROCESS AND APPARATUS FOR WELDING WORKPIECE HAVING HEAT SENSITIVE MATERIAL

TECHNICAL FIELD

This invention relates generally to a process and an apparatus for welding a workpiece having heat sensitive material, in particular, austenitic manganese steel.

DESCRIPTION OF RELATED ART

Fusion welding is a process that uses thermal energy to melt materials to be joint and creates a solid joint when solidified. Arc welding is one of the most common fusion welding techniques wherein coalescence of metals occurs using the heat from an arc between a continuously fed filler metal and welding surface of a base metal. Fusion welding process is a widely used welding technique. However, this process may heat the welding surface to a temperature that cause undesirable material changes, such as hardening and warpage and in extreme conditions cause cracking of the materials.

An extensively used subset of austenitic manganese steel is Hadfield manganese steel, which is a high strength and an extremely tough nonmagnetic alloy. It is of great interest for generator components in power generation applications. However, Hadfield manganese steel is heat sensitive. It may crack if overheated. Fusion welding Hadfield manganese steel is extremely difficult because this material is prone to cracking if overheated during welding.

SUMMARY OF INVENTION

Briefly described, aspects of the present invention relate to a process and an apparatus for welding a workpiece having heat sensitive material, in particular, austenitic manganese steel.

According to an aspect, a welding process for welding a workpiece is presented. The process comprises providing electrical power from a power source to a contact tip of a welding torch. The process comprises feeding a filler metal from a filler metal feeder and extending the filler metal through the contact tip towards the workpiece. The workpiece comprises a heat sensitive material. The process comprises melting a portion of the workpiece to create a weld pool on the workpiece by an arc generated between a tip of the filler metal and a surface of the workpiece. The process comprises reciprocating the filler metal in and out of the weld pool. The process comprises synchronizing a motion of the filler metal with a waveform of the electrical power. The process comprises adjusting a welding parameter such that a weld is able to be performed on the workpiece without cracking the heat sensitive material.

According to an aspect, a welding apparatus for welding a workpiece is presented. The welding apparatus comprises a welding torch comprising a contact tip. The welding apparatus comprises a power source configured to provide electrical power to the contact tip of the welding torch. The welding apparatus comprises a filler metal feeder configured to feed a filler metal extending through the contact tip towards the workpiece. The workpiece comprises a heat sensitive material. An arc is generated between a tip of the filler metal and a surface of the workpiece to create a weld pool on the workpiece. The welding apparatus comprises a drive configured to reciprocate the filler metal in and out of the weld pool. The power source comprises a digital signal processor. The digital signal processor is configured to signal the drive such that a motion of the filler metal is synchronized with a waveform of the electrical power. A welding parameter is adjusted such that a weld is able to be performed on the workpiece without cracking the heat sensitive material.

Various aspects and embodiments of the application as described above and hereinafter may not only be used in the combinations explicitly described, but also in other combinations. Modifications will occur to the skilled person upon reading and understanding of the description.

BRIEF DESCRIPTION OF DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
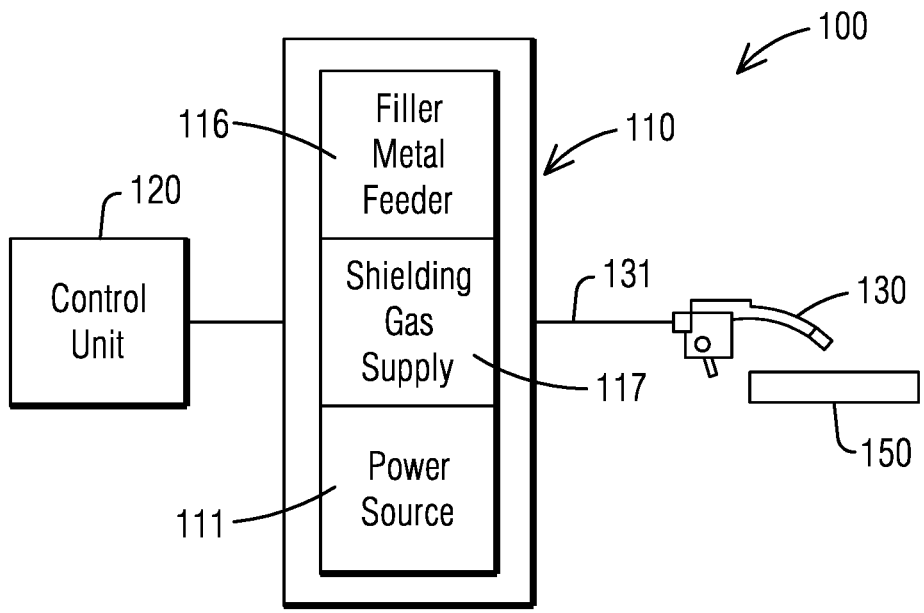
FIG. 1 illustrates a schematic diagram of a welding apparatus for welding a workpiece having heat sensitive material using a reciprocating wire feed gas metal arc welding according to an embodiment.

FIG. 1 illustrates a schematic diagram of a welding apparatus 100 according to an embodiment. The welding apparatus 100 may include a supply housing 110. The supply housing 110 may include a power source 111, a filler metal feeder 116, and a shielding gas supply 117. The power source 111 may be electrically connected to the filler metal feeder 116. The power source 111 may be electrically connected to the shielding gas supply 117. The welding apparatus 100 may include a welding torch 130. The welding torch 130 may be operationally connected to the supply housing 110 via an insulated conduit 131. The welding torch 130 may perform a welding process on a workpiece 150. The welding apparatus 100 may include a control unit 120. The control unit 120 may be operationally connected to the supply housing 110.

Figure 2:
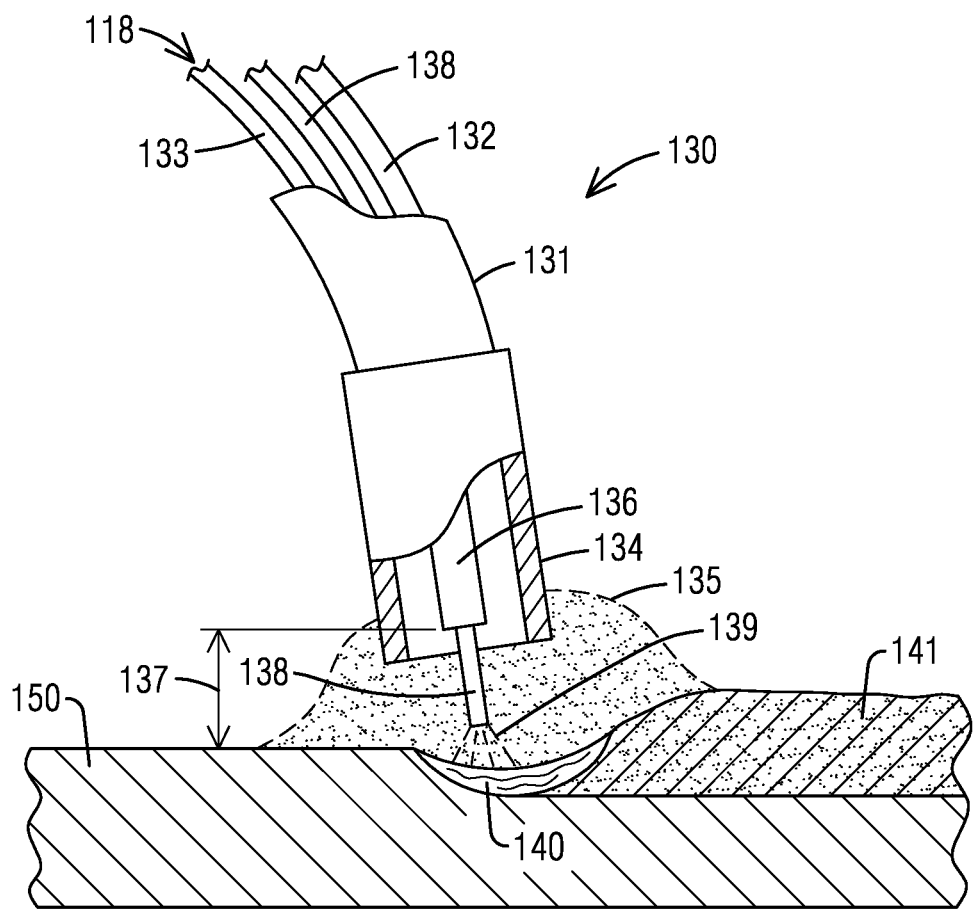
FIG. 2 illustrates a schematic diagram of a gas metal arc welding process.

Fusion welding process is widely used in industrial applications. Gas Metal Arc Welding (GMAW) process is one of the most common fusion welding processes. FIG. 2 illustrates a schematic diagram of a GMAW process. A welding torch 130 may include an insulated conduit 131. The insulated conduit 131 may enclose a power cable 132. The power cable 132 may be connected to a power source 111. The welding torch 130 may include a contact tip 136. The power cable 132 may provide electrical power to the contact tip 136 from the power source 111. Contact Tip to Work Distance (CTWD) 137 may refer to a distance from the contact tip 136 to a surface of the workpiece 150. The insulated conduit 131 may enclose a filler metal 138. The filler metal 138 may be fed from the filler metal feeder 116. The filler metal 138 may extend through the contact tip 136 towards a workpiece 150. The electrical power of the contact tip 136 may be transmitted to the filler metal 138 at the contact tip 136. The extension of the filler metal 138 through the contact tip 136 may become an electrode. The insulated conduit 131 may enclose a shielding gas hose 133. The shielding gas hose 133 may be connected to the shielding gas supply 117. Shielding gas 118 may be fed into the welding torch 130 through the hose shielding gas 133. The welding torch 130 may include a gas nozzle 134. The shielding gas 118 may create a gaseous shield 135 when passing through the gas nozzle 134.

During a welding process, an arc 139 may be generated when the filler metal 138 in contact to a surface of the workpiece 150. The arc 139 may generate heat input. The heat input from the arc 139 may melt a portion of the workpiece 150 to create a weld pool 140. The heat input from the arc 139 may melt a tip of the filler metal 138. The molten tip of the filler metal 138 may be transferred to the weld pool 140. Weld metal 141 may be formed on the workpiece 150 after solidification. The gaseous shield 135 may prevent atmospheric contamination of the filler metal 138, the arc 139, and the weld pool 140 during the welding process.

Figure 3:
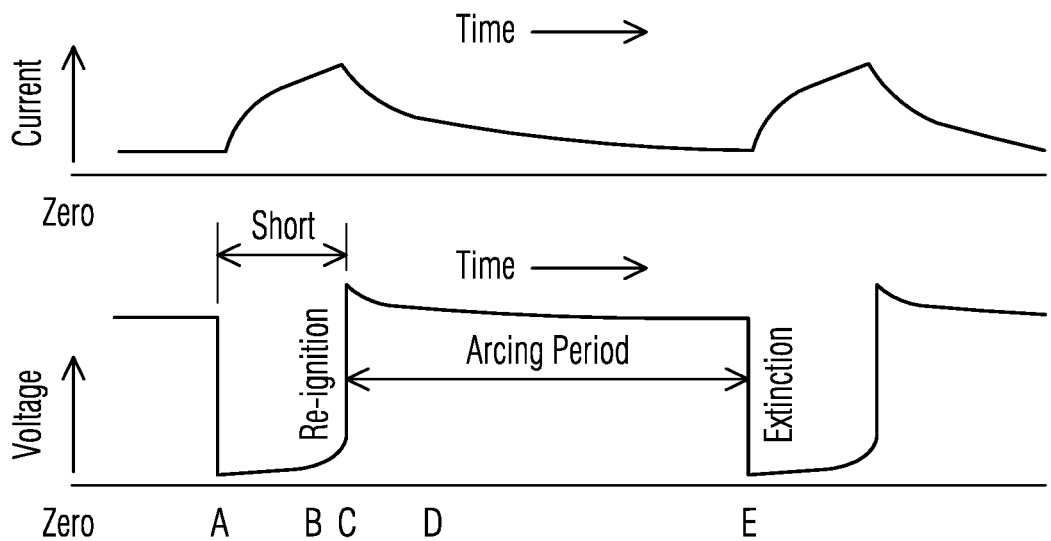
FIG. 3 illustrates a schematic diagram of voltage and current waveforms of an electrical power in a short circuit metal transfer mode of gas metal arc welding.

In GMAW process, a short circuit metal transfer may produce a relative low heat input compared to other metal transfer mechanisms, such as globular metal transfer, spray metal transfer, pulse spray metal transfer. FIG. 3 illustrates a schematic diagram of voltage and current waveforms of an electrical power in a short circuit metal transfer. A short circuit may be created at time A when the molten tip of the filler metal 138 touches the weld pool 140. The arc 139 may extinguish at time A. Voltage of the electrical power may decrease at time A. Current of the electrical power may increase at time A. The increasing current may generate a magnetic pinch force. The magnetic pinch force may cause the molten tip of the filler metal 138 to be transferred to the weld pool 140 at time B. The arc 139 may reignite when a contact between the tip of the filler metal 138 and the weld pool 140 breaks at time C. The cycle of metal transfer may repeat with an arcing period D and a short circuit at time E. The filler metal 138 may be continuously fed from the filler metal supply 116 towards the workpiece 150 into the weld pool 140 during the cycle.

The problems with a conventional short circuit metal transfer GMAW are associated with random short circuits that may occur at erratic intervals of varied intensities. The resultant agitation of a weld pool results in weld splashing, sidewall freezing, cold laps and lack of fusion. A high level of spatter may be produced. The heat input generated in a conventional short circuit metal transfer GMAW may be relatively too high to crack a workpiece 150 having a heat sensitive material.

Reciprocating Wire Feed (RWF)-GMAW processes have been developed by several welding equipment manufacturers to address issues in a conventional GMAW short circuit metal transfer. In RWF-GMAW processes, a filler metal 138, such as a wire, may be reciprocated in and out of a weld pool 140, rather than continuously moving forward in a conventional GMAW process. The motion of the filler metal 138 may be controlled by electronic regulation within a power source 111. The motion of the filler metal 138 may be synchronized with a waveform of the power source 111. Examples of RWF-GMAW processes may include Fronius Cold Metal Transfer, Jetline Controlled Short Circuit, SKS Welding System MicroMig, Panasonic Active Wire Process, etc.

Figure 4:
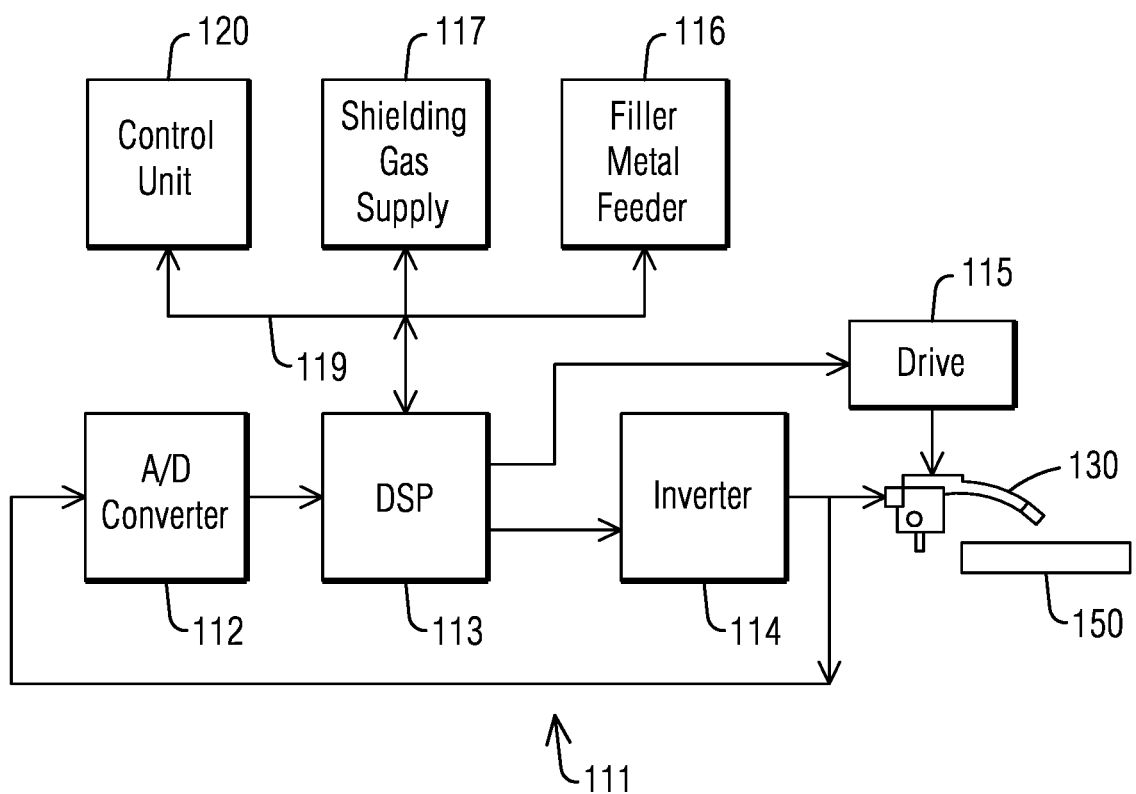
FIG. 4 illustrates a schematic diagram of a control system of a reciprocating wire feed gas metal arc welding process.

FIG. 4 illustrates a schematic diagram of a control system of a RWF-GMAW process. The system may include a power source 111. The power source 111 may include an Analog/Digital (A/D) converter 112. The A/D converter 112 may convert power signal from analog to digital. The digitized power signal may be processed by a Digital Signal Processor (DSP) 113. When the DSP 113 detects a short circuit, it may signal a drive 115 to retract a filler metal 138 out of a weld pool 140. The molten tip of the filler metal 138 may be transferred to the weld pool 140 by a combination of mechanical retraction force of the drive 115 and a pinch force of increased current of short circuit. The DSP 113 may signal the drive 115 to feed the filler metal 138 forward to the weld pool 140 when an arc 139 reignites. The cycle may repeat when a short circuit occurs again. The power source 111 may include an inverter 114. The inverter 114 may provide a quickly digitized closed feedback control of current and voltage of the power source 111. The DSP 113 may be connected with a control unit 120, a filler metal feeder 116, and a shielding gas supply 117 via an interface, such as a data bus 119. Welding parameters may be stored in the DSP 113 for combinations of different workpieces 150, filler metal 138 and shielding gas 118. The control unit 120 may monitor, display, or document the welding parameters to ensure an optimized welding process.

Figure 5:
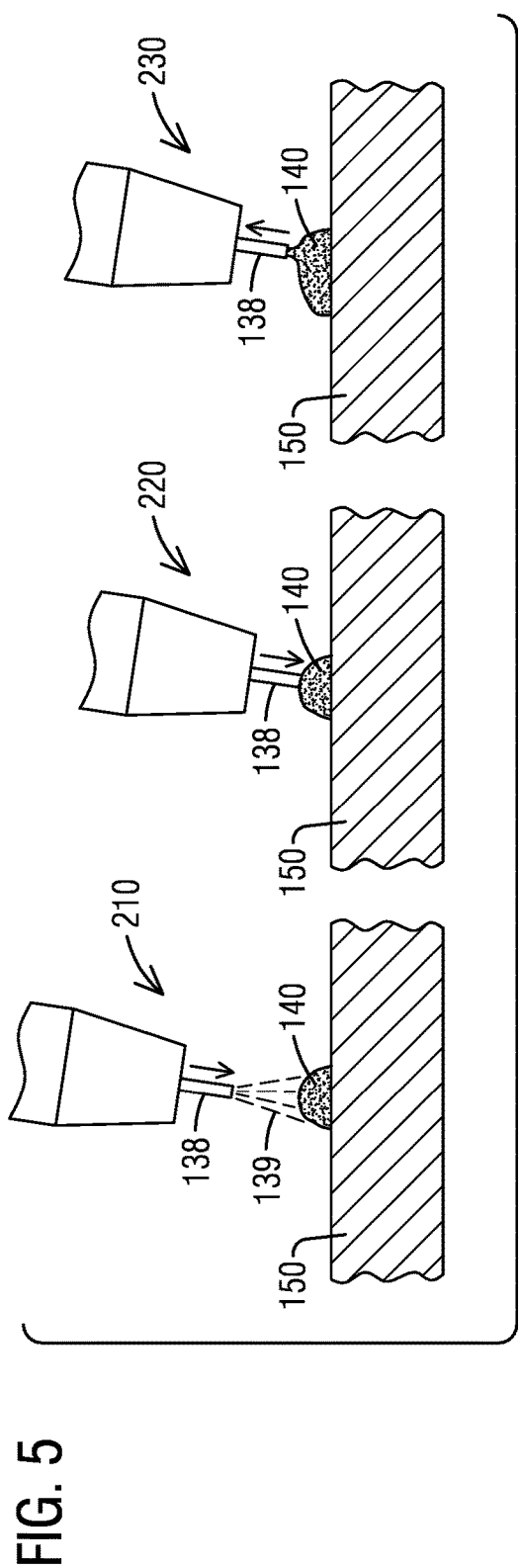
FIG. 5 illustrates steps of motion of filler metal in a reciprocating wire feed gas metal arc welding process.

FIG. 5 illustrates steps of motion of a filler metal 138 in a RWF-GMAW process. During an arcing period at step 210, an arc 139 may be established between a tip of the filler metal 138 and a surface of the workpiece 150. Heat input from the arc 139 may create a weld pool 140 at the surface of the workpiece 150. The filler metal 138 may be moved towards the weld pool 140 during the arcing period at step 210. A short circuit may be created when tip of the filler metal 138 touches the weld pool 140 at step 220. The arc 139 may be extinguished at the short circuit period. The filler metal 138 may be retracted mechanically out of the weld pool 140 to support metal transfer during the short circuit period at step 230. The arc 139 may reignite again when a contact between the tip of the filler metal 138 and the weld pool 140 breaks at step 210. The motion of the filler metal 138 may be reversed back towards the weld pool 140 during the arcing period as illustrated at step 210. The cycle may then repeat again.

The RWF-GMAW process may integrate control of motion of the filler metal 138 into welding process control by synchronizing the motion of the filler metal 138 with a waveform of the electrical power. The mechanical retraction of the filler metal 138 may assist metal transfer to maintain current at a very low level during a short circuit. Heat input of the RWF-GMAW process may be greatly reduced due to a virtually current-free metal transfer. The RWF-GMAW process may produce only a fraction of heat input compared to a conventional GMAW process. For example, the RWF-GMAW process may produce a heat input for less than 1 kJ/in. Spatter levels of the RWF-GMAW process may also be greatly reduced.

The RWF-GMAW process may be applied to welding applications that require low heat input. The RWF-GMAW process may provide less base metal dilution. However, the RWF-GMAW process may be much more complex than a conventional GMAW process. There may be more than 60 adjustable welding parameters to ensure an optimized welding. Some manufactures may store pre-programmed welding parameters in the DSP 113 of the power source 111. However, there are no readily available pre-programmed process parameters for welding austenitic manganese steels, specifically Hadfield manganese steel. Welding parameters may need to be specifically developed for a difficult welding application, for example in an application of welding Hadfield manganese steel. Welding parameter may include, for example, heat input, current, voltage, contact tip to work distance, flow rate of shielding gas, wire feed speed, welding travel speed, travel angle, work angle, etc.

Figure 6:
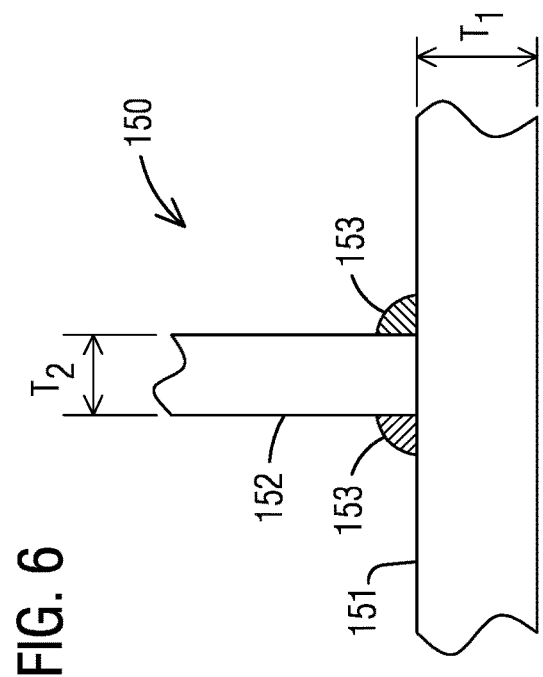
FIG. 6 illustrates a schematic cross-section view of a joint geometry of a workpiece having a heat sensitive material according to an embodiment.

FIG. 6 illustrates a joint geometry of a workpiece 150 having heat sensitive material to be welded using RWF-GMAW process according to an embodiment. The workpiece 150 may include a first metal piece 151 to be welded to a second metal piece 152. The first metal piece 151 may consist of a heat sensitive material. According to an embodiment, the heat sensitive material may include a Hadfield manganese steel. The Hadfield manganese steel may have a chemical composition by weight, for example: Carbon in a range of 1.00%-1.40%, Manganese in a range of 11%-14%, Silicon 1.00% maximum, Phosphorus 0.10% maximum, Sulphur 0.05% maximum, and Chromium 1.50% maximum. The Hadfield manganese steel may be in a wrought condition or in a cast condition. The second metal piece 152 may include similar metal material to the Hadfield manganese steel in the first metal piece 151. The second metal piece 152 may include dissimilar metal material to the Hadfield manganese steel in the first metal piece 151, such as austenitic stainless steel, or carbon steel. The austenitic stainless steel or carbon steel may be in a plate condition. The austenitic stainless steel may include grades 304, 304L, 316, 316L, etc. The carbon steel may include grade SA516.

The first metal piece 151 having heat sensitive material may be placed horizontally. The second metal piece 152 may be placed vertically to form a T-joint geometry. The second metal piece 152 may be clamped in position prior to welding. Other types of holding mechanism, such as tack welding the second metal piece 152 to the first metal piece 15, may also be used. The first metal piece 151 may have a thickness $T_1$. The thickness $T_1$ may be about 1 in (2.54 cm). The second metal piece 152 may have a thickness $T_2$. The thickness $T_2$ may be about ⅛ in (0.32 cm) for stainless steel, or about ½ in (0.27 cm) for carbon steel.

Weld 153 may be performed on both side of the T-joint. A size of the weld 153 may be about 0.17 in (0.43 cm). The weld 153 may be a fillet weld. Other weld types, such as groove weld, may also be used. Backing material may not be used at root of the joint. Welding may be performed with the workpiece 150 at room temperature. Welding position may be horizontal, e.g. 2F position per ASME Section IX 2013 Edition. Other types of welding position per ASME Section IX 2013 Edition, such as flat, e.g. 1F, or vertical positions, e.g. 3F, may also be used. Post weld heat treatment after welding may not be performed.

Filler metal 138 may be a stainless steel grade ER309, which may belong to classification SFA 5.9/5.9M. Other types of filler metal 138 may also be used, such as 18.8 Mn. The filler metal 138 may be in a solid wire form. A diameter of the filler metal 138 may be in a range of 0.045 in-0.062 in (1.143 mm-1.575 mm). For example, a diameter of the filler metal 138 may be 0.035 in (0.9 mm).

Shielding gas 118 may be inert or semi-inert gases. Shielding gas 118 may be Argon based, or a mixture of Argon and $CO_2$. For example, shielding gas 118 may be a mixture of 98% Argon and 2% $CO_2$. Flow rate of shielding gas 118 may be in a range of 15 ft$^3$/h-60 ft$^3$/h (0.42 m$^3$/h-1.7 m$^3$/h), or in a range of 25 ft$^3$/h-50 ft$^3$/h (0.71 m$^3$/h-1.42 m$^3$/h), or in a range of 35 ft$^3$/h-45 ft$^3$/h (0.99 m$^3$/h-1.27 m$^3$/h).

Electrical characteristics of power source 111 may be Direct Current Electrode Positive. Pulse frequency of the power source 111 may be 10 Hz.

According to an embodiment, for welding Hadfield manganese steel to austenitic stainless steel, current may be set in a range of 50 A-100 A, or in a range of 60 A-90 A, or in a range of 70 A-85 A. Voltage may be set in a range of 5 V-35 V, or in a range of 10 V-25 V, or in a range of 15 V-20 V. Heat input of RWF-GMAW process may be set in a range of 3 kJ/in-30 kJ/in (0.118 kJ/mm-1.182 kJ/mm), or in a range of 10 kJ/in-20 kJ/in (0.394 kJ/mm-0.788 kJ/mm), or in a range of 14 kJ/in-16 kJ/in (0.552 kJ/mm-0.63 kJ/mm).

According to an embodiment, for welding Hadfield manganese steel to carbon steel, current may be set in a range of 50 A-200 A, or in a range of 125 A-175 A, or in a range of 130 A-150 A. Voltage may be set in a range of 5 V-35 V, or in a range of 15 V-25 V, or in a range of 18 V-23 V. Heat input of RWF-GMAW process may be set in a range of 3 kJ/in-25 kJ/in (0.118 kJ/mm-0.985 kJ/mm), or in a range of 10 kJ/in-20 kJ/in (0.394 kJ/mm-0.788 kJ/mm), or in a range of 11 kJ/in-15 kJ/in (0.433 kJ/mm-0.591 kJ/mm).

Weld 153 may be performed using single pass. Weld 153 may also be performed using multi pass.

According to an embodiment, for welding Hadfield manganese steel to austenitic stainless steel, welding travel speed of the welding torch 130 when performing the weld 153 may be set in a range of 4 in/min-10 in/min (10.16 cm/min-25.4 cm/min), or in a range of 5.8 in/min-6.2 in/min (14.73 cm/min-15.75 cm/min).

According to an embodiment, for welding Hadfield manganese steel to carbon steel, welding travel speed of the welding torch 130 when performing the weld 153 may be set in a range of 5 in/min-30 in/min (12.7 cm/min-76.2 cm/min), or in a range of 10 in/min-20 in/min (25.4 cm/min-50.8 cm/min), or in a range of 14 in/min-18 in/min (35.56 cm/min-45.72 cm/min). Contact tip to work distance 137 may be about 7/16 in (1.11 cm).

Figure 7:
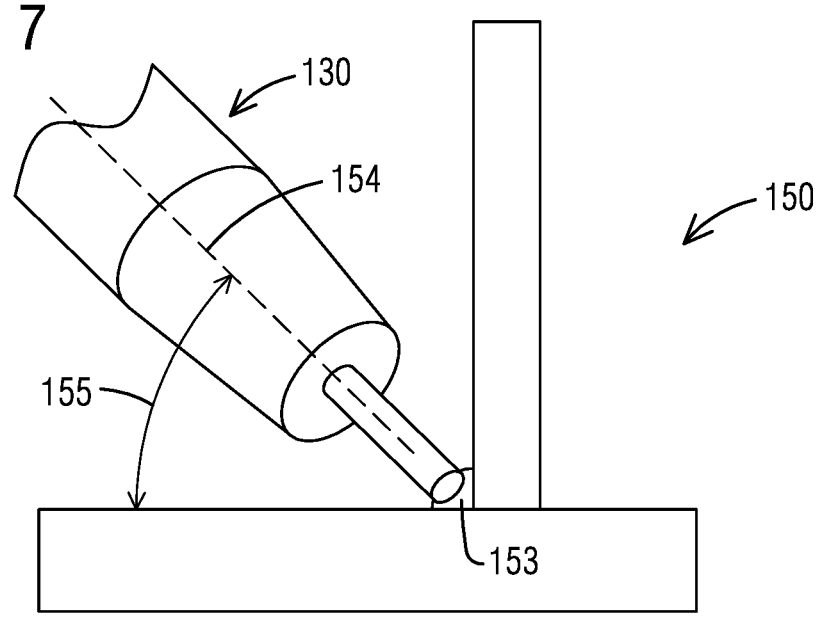
FIG. 7 illustrates a schematic diagram of a work angle of a workpiece having a heat sensitive material according to an embodiment.

FIG. 7 illustrates a schematic diagram of a work angle 155 of a welding torch 130 when performing a weld 153 on a workpiece 150. According to an embodiment, the work angle 155 may be in a range of 45 degree-65 degree from horizontal to longitudinal axis 154 of the welding torch 130. For example, the work angle 155 may be about 55 degree from horizontal to longitudinal axis 154 of the welding torch 130.

Figure 8:
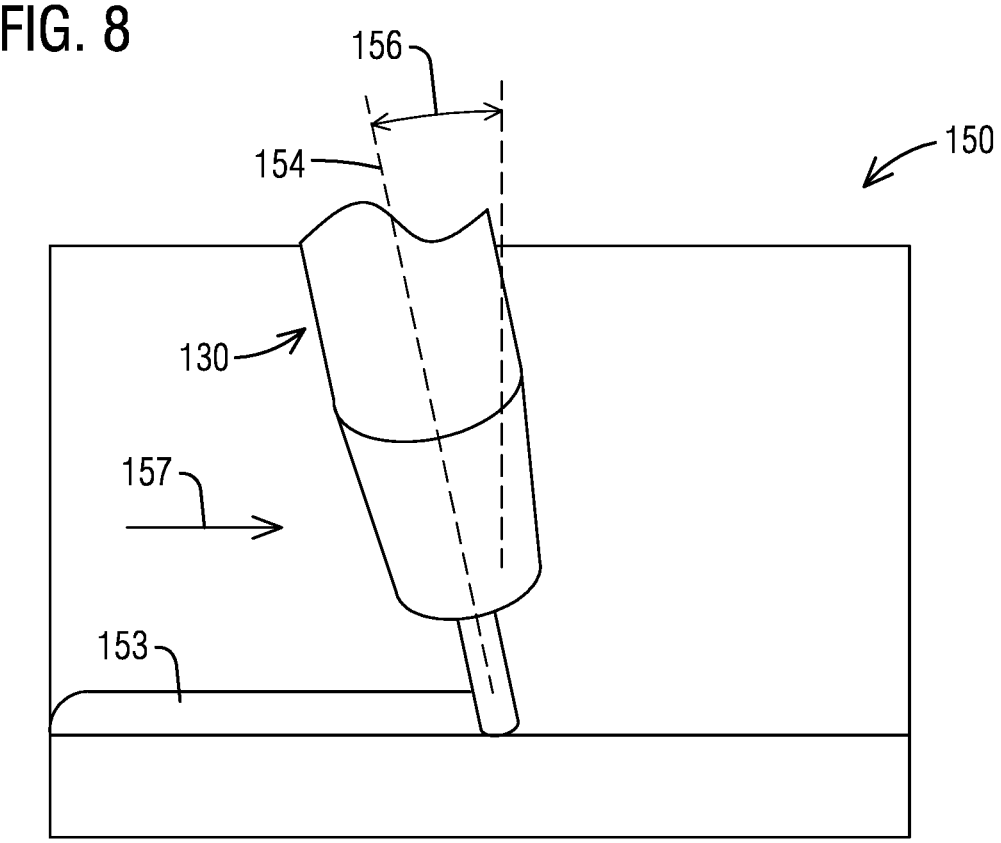
FIG. 8 illustrates a schematic diagram of a travel angle of a workpiece having a heat sensitive material according to an embodiment.

FIG. 8 illustrates a schematic diagram of a travel angle 156 of a welding torch 130 when performing a weld 153 on a workpiece 150. According to an embodiment, the travel angle 156 may be set in a range of 0-20 degree push, which means the welding torch 130 is directed toward a travel direction 157 and angle from vertical to the longitudinal axis 154 of the welding torch 130 is in a range of 0-20 degree. For example, the travel angle may be about 10 degree push.

Figure 9:
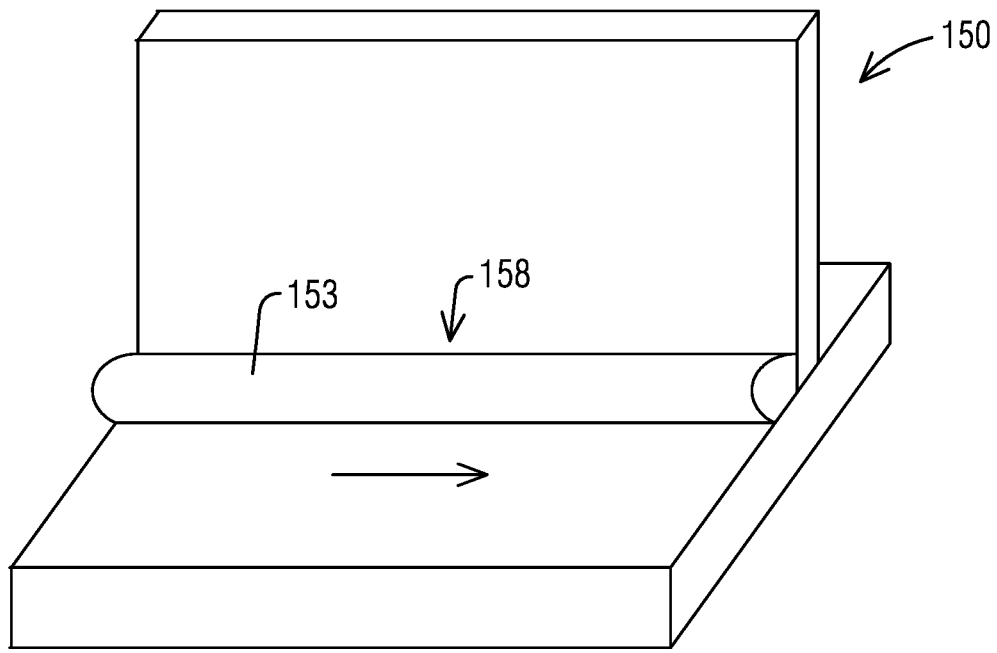
FIG. 9 illustrates a perspective view of a stringer bead pattern of a workpiece having a heat sensitive material according to an embodiment.
Figure 10:
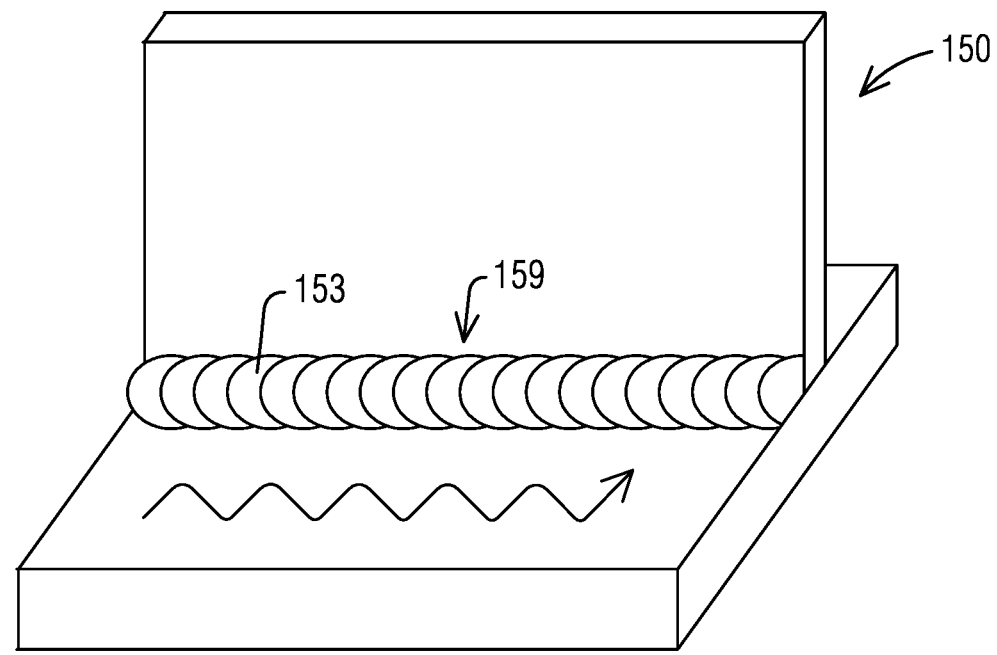
FIG. 10 illustrates a perspective view of a weave bead pattern of a workpiece having a heat sensitive material according to an embodiment.

FIG. 9 illustrates a perspective view of a stringer bead pattern 158 of a weld 153 on a workpiece 150. A stringer bead pattern 158 is a type of weld 153 that may be formed by a straight movement of a welding torch as shown by the arrow. FIG. 10 illustrates a perspective view of a weave bead pattern 159 of a weld 153 on a workpiece 150. A weave bead pattern 159 is a type of weld 153 that may be formed by traverse oscillation movement a welding torch as shown by the arrow. According to an embodiment, a weave bead pattern 159 may be used for the weld 153. A stringer bead pattern 158 may also be used for the weld 153.

According to an aspect, the proposed process may adjust a RWF-GMAW process for welding heat sensitive material, for example, welding Hadfield manganese steel. The proposed RWF-GMAW process may provide much lower heat input compared to conventional GMAW process. The low heat input may result in low base metal dilution and prevent cracking during welding that may result improve welding quality.

According to an aspect, the proposed process provides optimized welding parameters for welding heat sensitive material using a RWF-GMAW process. The welding parameters may be closed controlled by a digitized microprocessor controlled inverter power source 111. The proposed process may provide a repeatable and reliable good quality welding every time.

According to an aspect, the proposed process may be applied to a RWF-GMAW process including Fronius Cold Metal Transfer, Jetline Controlled Short Circuit, SKS Welding System MicroMig, Panasonic Active Wire Process, etc. The welding may be an automatic operation by a robot. The welding may also be a manual operation for small localized welding.

Hadfield manganese steel is a high strength nonmagnetic alloy that is of a great interest for generator components in power generation applications. However, due to its heat sensitive property, it is very difficult to use Hadfield manganese steel in generator components. Traditionally, Gas Tungsten Arc Welding with reverse polarity has been used to weld Hadfield manganese steel. However, this process is a manual process and highly dependent on the operator's ability. Quality of welding is not reliable. The proposed process may allow this material to be welded on plurality parts of generators with good quality. The proposed process may allow the welding to be performed at plant locations.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

100: Welding Apparatus
110: Supply Housing
111: Power Source
112: Analog/Digital (A/D) Converter
113: Digital Signal Processer (DSP)
114: Inverter
115: Drive
116: Filler Metal Supply
117: Shielding Gas Supply
118: Shielding Gas
119: Data Bus
120: Control Unit
130: Welding Torch
131: Conduit
132: Power Cable
133: Shielding Gas Hose
134: Gas Nozzle
135: Gaseous Shield
136: Contact Tip
137: Contact Tip to Work Distance (CTWD)
138: Filler Metal
139: Arc
140: Weld Pool
141: Weld Metal
150: Workpiece
151: First Metal Piece
152: Second Metal Piece
153: Weld
154: Longitudinal Axis of Welding Torch
155: Work Angle
156: Travel Angle
157: Travel Direction
158: Stringer Bead Pattern
159: Weave Bead Pattern

What is claimed is:

1. A welding process for welding a workpiece comprising a heat sensitive material, the welding process comprising:
providing electrical power from a power source to a contact tip of a welding torch;
feeding a filler metal from a filler metal feeder and extending the filler metal through the contact tip towards the workpiece, wherein the workpiece comprises a heat sensitive material;
melting a portion of the workpiece to create a weld pool on the workpiece by an arc generated between a tip of the filler metal and a surface of the workpiece;
reciprocating the filler metal in and out of the weld pool;
synchronizing the reciprocating movement of the filler metal with a waveform of the electrical power to retract the filler metal in response to a short circuit; and
adjusting a welding parameter to produce a low heat input such that a weld is performed on the workpiece without cracking the heat sensitive material,
wherein the heat sensitive material comprises Hadfield manganese steel, and
wherein the polarity of the power source is Direct Current Electrode Positive (DCEP) during the providing the electrical power.

2. The welding process as claimed in claim 1, wherein the filler metal comprises a solid wire form.

3. The welding process as claimed in claim 1, wherein a plurality of welding parameters is adjusted, the plurality of welding parameters comprises current, voltage, heat input, and traveling speed,
  wherein the current is adjusted in a range of 50 A-100 A,
  wherein the voltage is adjusted in a range of 5 V-35 V,
  wherein the heat input is adjusted in a range of 3 kJ/in-30 kJ/in, and
  wherein the traveling speed is adjusted in a range of 4 in/min 10 in/min.

4. The welding process as claimed in claim 1, wherein the welding parameter comprises current, and wherein the current is adjusted in a range of 60 A-90 A.

5. The welding process as claimed in claim 1, wherein the welding parameter comprises voltage, and wherein the voltage is adjusted in a range of 10 V-25 V.

6. The welding process as claimed in claim 1, wherein the welding parameter comprises welding travel speed, and wherein the welding travel speed is adjusted in a range 5.8 in/min-6.2 in/min.

7. The welding process as claimed in claim 1, wherein the welding parameter comprises work angle, and wherein the work angle is adjusted in a range of 45 degree-65 degree from horizontal.

8. The welding process as claimed in claim 1, wherein the welding parameter comprises travel angle, and wherein the travel angle is adjusted in a range of 0 degree-20 degree push.

9. The welding process as claimed in claim 1, wherein the welding parameter comprises flow rate of the shielding gas, and wherein the flow rate of the shielding gas is adjusted in a range of 15 ft³/h-60 ft³/h.

10. The welding process as claimed in claim 1, wherein the welding parameter comprises heat input, and wherein the heat input is adjusted in a range of 10 kJ/in-20 kJ/in.

11. The welding process as claimed in claim 1, wherein the welding parameter comprises current, and wherein the current is adjusted in a range of 70 A-85 A.

12. The welding process as claimed in claim 1, wherein the welding parameter comprises voltage, and wherein the voltage is adjusted in a range of 15 V-20 V.

13. The welding process as claimed in claim 1, wherein the welding parameter comprises heat input, and wherein the heat input is adjusted in a range of 14 kJ/in-16 kJ/in.

14. The welding process as claimed in claim 1, wherein a plurality of welding parameters is adjusted, the plurality of welding parameters comprises current, voltage, heat input, and traveling speed,
  wherein the current is adjusted in a range of 50 A-200 A,
  wherein the voltage is adjusted in a range of 5 V-35 V,
  wherein the heat input is adjusted in a range of 3 kJ/in-25 kJ/in, and
  wherein the traveling speed is adjusted in a range of 5 in/min-30 in/min.

15. The welding process as claimed in claim 1, wherein the welding parameter comprises current, and wherein the current is adjusted in a range of 125 A-175 A.

16. The welding process as claimed in claim 1, wherein the welding parameter comprises voltage, and wherein the voltage is adjusted in a range of 15 V-25 V.

17. The welding process as claimed in claim 1, wherein the welding parameter comprises current, and wherein the current is adjusted in a range of 130 A-150 A.

18. The welding process as claimed in claim 1, wherein the welding parameter comprises voltage, and wherein the voltage is adjusted in a range of 18 V-23 V.

19. The welding process as claimed in claim 1, wherein the welding parameter comprises heat input, and wherein the heat input is adjusted in a range of 11 kJ/in-15 kJ/in.

20. The welding process as claimed in claim 1, wherein the welding parameter comprises travel speed, and wherein the traveling speed is adjusted in a range of 10 in/min-20 in/min.

* * * * *